Feb. 1, 1944. W. BYRD, JR 2,340,303
MAGNETIC SEPARATOR
Filed Dec. 16, 1940 2 Sheets-Sheet 1
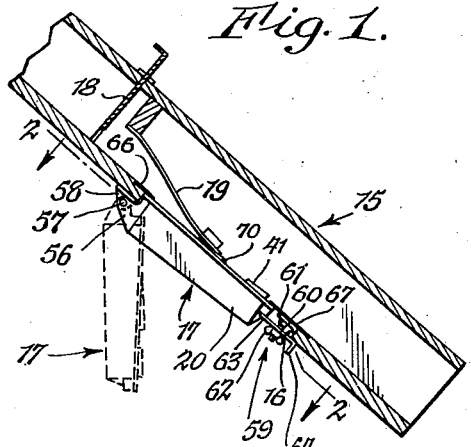
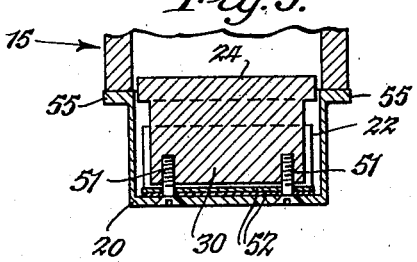
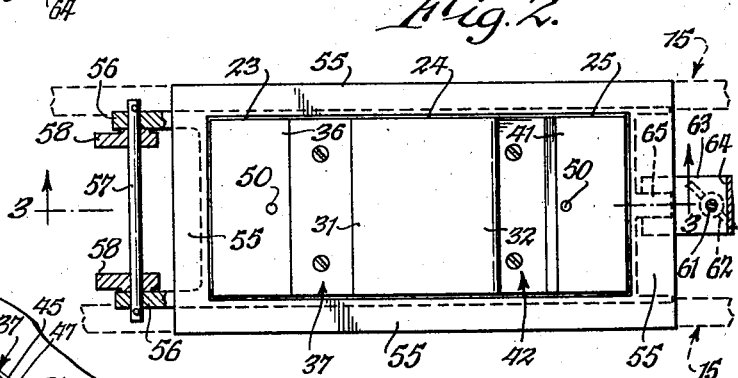
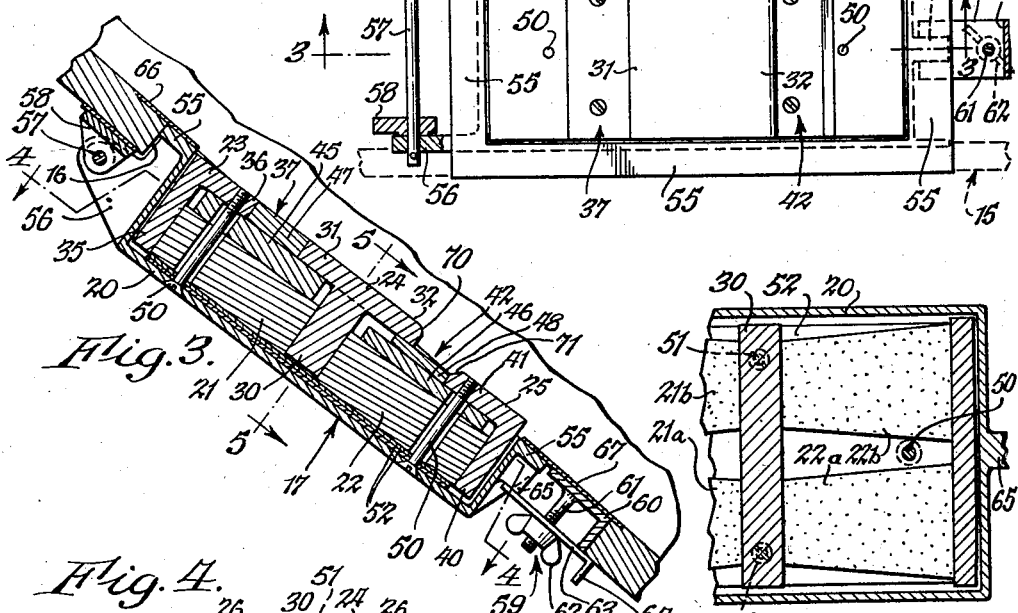
INVENTOR
William Byrd, Jr.
BY Popp and Popp
ATTORNEYS Feb. 1, 1944. W. BYRD, JR 2,340,303
MAGNETIC SEPARATOR
Filed Dec. 16, 1940 2 Sheets-Sheet 2
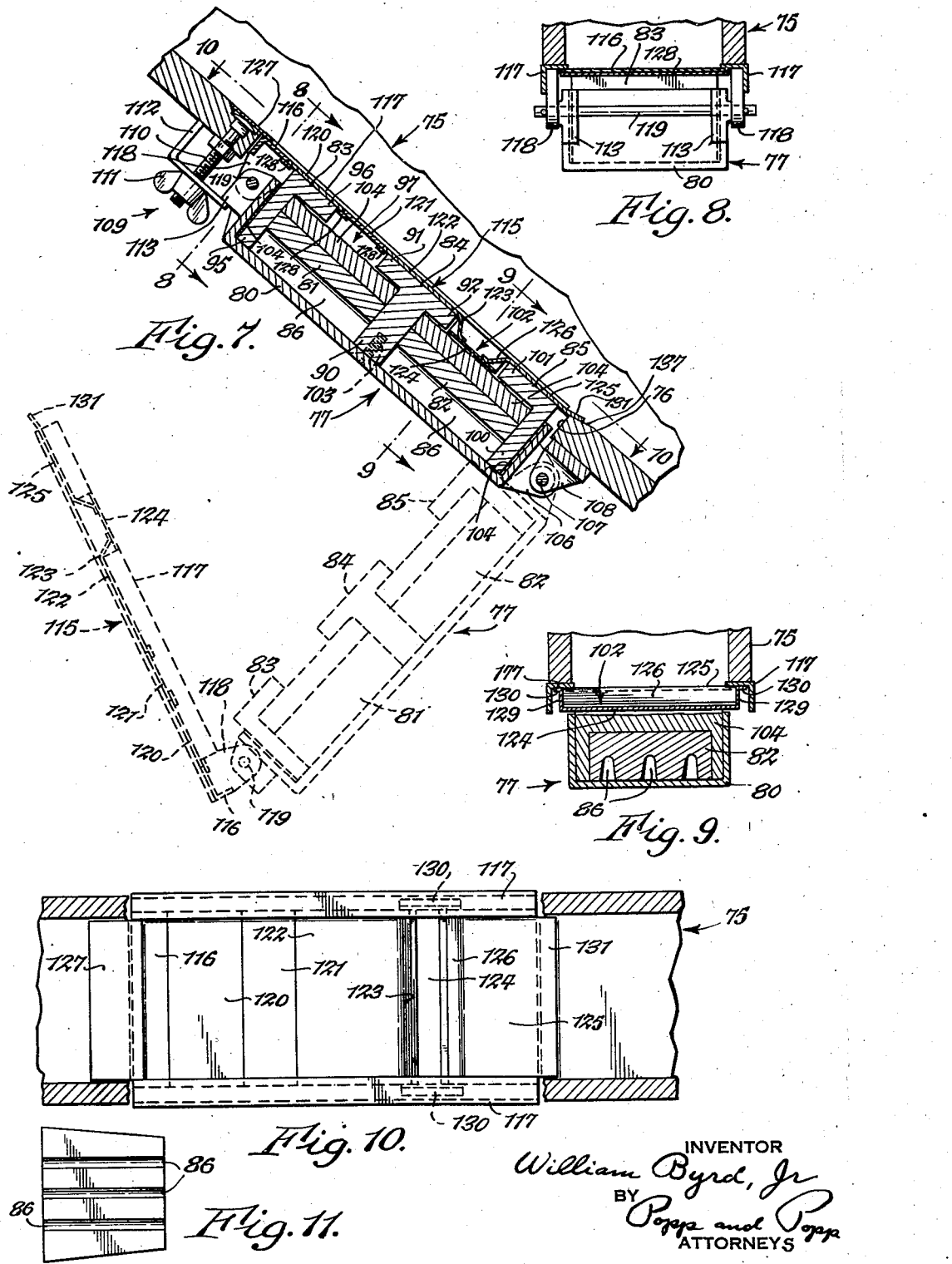

Patented Feb. 1, 1944

2,340,303

UNITED STATES PATENT OFFICE 2,340,303

MAGNETIC SEPARATOR

William Byrd, Jr., Princeton, N. J., assignor to Richmond Manufacturing Company, Lockport, N. Y., a corporation of New York Application December 16, 1940, Serial No. 370,306

9 Claims. (Cl. 209—228)

This invention relates to a magnet and more particularly to a permanent magnet separator mounted in a trough, spout, duct or other conduit through which in the course of industrial operations, pass materials bearing magnetic contaminants which are required to be removed.

Trough separators employing electromagnets have long been known. They are open to the objections that they require an uninterrupted source of electric power causing them to generate considerable heat and thereby be liable to burn outs, breakdowns, insulation failure, and the like, which cause dangerous fire hazards. Such breakdowns and failure, as well as any interruption in the source of electric power result in costly interruptions to production. Furthermore, partial or total loss of magnetism of such electromagnet, even though temporary, might result in damage to other equipment by releasing tramp iron already caught, which released tramp iron might recontaminate a batch of cleaned material, with consequent injury to equipment used in the later processing of the material.

Because of these inherent shortcomings of an electromagnet when used in a spout separator it has already been proposed to employ a permanent magnet as the source of attractive energy in such a separator. Prior to the recent advent of certain high energy magnetic alloys, such permanent magnets were not satisfactory because of the low energy of all available materials which required the permanent magnets to be excessively large to provide the necessary attractive energy. After the advent of these high energy alloys, it was believed that permanent magnet separators of performance comparable to the performance of electromagnet separators would become available. Such has not been the case, all available permanent magnet trough or spout separators, so far as I am aware, being of inferior performance.

It is therefore one of the principal objects of this invention to provide a long life permanent magnet separator employing such high energy magnetic alloys in which the magnetic properties of each part are fully utilized and the separator as a whole is at the same time of reduced weight, bulk and cost and of greatly improved performance to have an attractive capacity equal to electromagnetic separators without their disadvantages above stated.

Another object is to provide such a separator in which the permanent magnets are in the form of simple blocks which are readily and economically cast from such high energy magnetic alloys and are also readily magnetized and mounted in the structure of the separator.

Another object of the invention is to provide such blocks of high energy magnetic alloys which are of such form, arrangement and proportions to permit efficient use in a spout magnetic separator of the magnetic energy available.

Another object is to provide, in combination and magnetic cooperation with a pair of such blocks, pole pieces of such form, arrangement and proportions as to provide the maximum attracting and catching properties for the separator.

Another object is to provide a magnetic separator, having either a permanent or an electromagnet as its source of attractive energy, in which the downstream edge of one of the pole pieces is stepped and of blunt form, that is, curved or beveled, to exert a maximum upstream pull on passing magnetic objects to insure their entrapment, thereby to be particularly effective in catching such difficult objects as steel balls and the like.

Another purpose is to provide such a magnetic separator in which the pole piece on the opposite side of the gap from the step of said stepped pole piece is beveled at its edge opposing said step to provide an intensified field in a pocket formed between these two pole pieces.

Another object is to provide such blocks of high energy magnetic alloys which can be cast in large sizes and with sufficient cooling surface to permit the rate of cooling necessary to obtain the best magnetic properties.

Another object is to provide a permanent magnet assembly made up of a pair of magnetized blocks and three pole pieces in which the poles of the assembly are all arranged in the same general plane.

Another object is to provide a permanent magnet assembly which can be made up of a plurality of pairs of magnetized blocks arranged in parallel, thereby to provide low cost assemblies by the use of different numbers of identical magnetic blocks for magnetic assemblies of different capacities.

Another aim is to provide a non-magnetic casing or holder for the permanent magnet assembly which supports the assembly and completely encloses the permanent magnets to eliminate all hazards of loss of magnetization in normal service due to inadvertent placing of magnetizable objects against surfaces of said magnets or willful tampering with the magnet by inexperienced hands.

Another object is to provide such a housed permanent magnet assembly in which the permanent magnets and pole pieces are securely held in position in the housing by a hard setting non-magnetic sealing compound, thereby to avoid the necessity of bolts or other fastenings and to avoid the necessity of providing bolt holes in the permanent magnet blocks. This hard setting sealing compound may be employed to eliminate the necessity for separate blocks of non-magnetic material in the gaps between the pole pieces.

Another object is to provide a permanent magnet spout separator of simple and durable construction which can be readily cleaned by the provision of means for withdrawing all of the collected tramp iron in a mass from the region of the permanent magnet, following which the tramp iron can be readily removed.

In the accompanying drawings:

Fig. 1 is a vertical longitudinal section through an inclined chute in the bottom of which is mounted one form of a permanent magnet separator embodying my invention, this separator attracting and catching any magnetic contaminants present in the material passing down the chute.

Fig. 2 is a longitudinal section taken generally on line 2—2, Fig. 1.

Fig. 3 is a vertical, longitudinal, central section taken on line 3—3, Fig. 2.

Fig. 4 is a fragmentary, longitudinal section taken on line 4—4, Fig. 3.

Fig. 5 is a fragmentary, transverse section taken on line 5—5, Fig. 3.

Fig. 6 is a fragmentary view similar to Fig. 4 showing a modified form of my invention in which a plurality of pairs of permanent magnet blocks are arranged in parallel.

Fig. 7 is a view similar to Fig. 3 and showing a modified form of my invention in which provision is made for the ready removal of collected tramp iron in a mass and showing a different form of permanent magnetic blocks.

Fig. 8 is a fragmentary, transverse section taken on line 8—8, Fig. 7.

Fig. 9 is a fragmentary, transverse section taken on line 9—9, Fig. 7.

Fig. 10 is a horizontal section taken on line 10—10, Fig. 7.

Fig. 11 is a bottom plan of one of the magnetic blocks used in the formed of the invention shown in Figs. 7–10.

The magnetic separator shown in Figs. 1–5 is shown as mounted in a covered inclined chute 15 which is provided in its bottom with an opening 16 in which the magnetic separator, indicated generally at 17, is mounted. The chute is shown as provided above the opening 16 with a shutoff gate or slide 18 which can be of any suitable form to hold back the grain or other materials flowing down the chute when it is desired to clear the magnetic separator of any magnetic contaminants which it has collected. The gate 18 can also be used to control the amount of material passed over the magnetic separator 17. The material flowing down the chute is brought into intimate relation with the field of the magnetic separator 17 by a baffle 19 of flexible material which can be secured to the top wall of the chute 15 in any suitable manner and has its trailing edge weighted to urge the passing material into intimate relation with the magnetic separator as best shown in Fig. 1.

The magnetic separator is shown as comprising a non-magnetic holder or casing 20 for a pair of permanent magnetic blocks 21, 22 and three pole pieces 23, 24 and 25 of high permeability. The permanent magnet blocks 21, 22, are identical and hence a description of one will be deemed to apply to both.

The permanent magnet blocks are cast of a high reluctance precipitation-hardening material, preferably an alloy of iron, cobalt, nickel, aluminum, carbon and manganese, the exact proportions being selected for maximum hysteretic energy. To secure the necessary attractive force with permanent magnet blocks of minimum size and mass, the novel form and proportions of these blocks are important, these constituting an important feature of the present invention. The exact length of these blocks is subject to variation, depending on the force and depth of field which the magnet is required to develop. The thickness of each block is preferably uniform throughout its length and this thickness is of the order of three-tenths of the length of the block. A rectangular cross section is employed for mechanical simplicity. The blocks are tapered at their sides, these tapering sides 26 preferably being straight, as shown in Fig. 4, and the cross section of each block increasing progressively from the small end of the block to the large end thereof. In the assembly of the pair of blocks 21, 22 within the casing or holder 20, the blocks are placed with their smaller ends in opposing relation at the center of the assembly. The larger outer ends of the pair of blocks are of like polarity, for example, north poles and the smaller inner ends of the opposite polarity, for example, south poles. The width of each block 21, 22 is dependent on the requirements as to the width of the complete magnet assembly.

The smaller or inner ends of the permanent magnet blocks 21, 22 abut squarely against the opposite sides of the leg 30 of the central pole piece 24, as best shown in Fig. 3, this pole piece being made of low reluctance iron or steel in the form of an elongated bar which is T-shaped in cross section. The upper part of this central pole piece 24 is in the form of flanges 31 and 32 which extend in opposite directions over the small ends of the permanent magnet blocks 21, 22 in spaced relation thereto.

The pole piece 23 at the large end of the permanent magnet block 21 is in the form of a bar of low reluctance iron or steel and L-shaped in cross section, this pole piece having a leg or riser 35 against which the large end of the magnet block 21 squarely abuts and having a flange 36 at its upper end which extends inwardly over the large end of the permanent magnet block in spaced relation thereto and toward the flange 31 of the center pole piece 24 to provide a magnetic gap 37 between these flanges.

The pole piece 25 at the large end of the permanent magnet block 22 is in the form of a bar of low reluctance iron or steel and L-shaped in cross section, this pole piece having a leg or riser 40 against which the large end of the magnet block 22 squarely abuts and having a flange 41 at its upper end which extends inwardly over the large end of the permanent magnet block in spaced relation thereto and toward the flange 32 of the center pole piece 24 to provide a magnetic gap 42 between these flanges.

The flanges 31, 32, 36 and 41 extend substantially parallel with the plane of the upper faces of the magnetic blocks. These flanges are all arranged in the same general plane, the flange 41 of the pole piece 25 being set somewhat lower with respect to the upper surface of the magnet block 22, however. The height of the risers and width of the flanges of the pole pieces 23 and 25 are preferably so chosen with respect to the length and thickness of the blocks 21 and 22 that the clear space between the upper surfaces of the blocks 21 and 22 and the undersides of the corresponding flanges 36 and 41 is of the order of one-half the width of the gap associated with that block, the width of the gap being from one-quarter to one-half the length of block associated with that gap. This form and arrangement of the magnetic blocks and the three pole pieces have been found to afford excellent catching power which is sustained even after large quantities of tramp iron have been caught. Furthermore, in view of the relatively high permeability of the material of the pole pieces 23, 24 and 25 their cross sections to flux need not be more than a fraction of the magnet block cross section. For example, the cross section of the leg of the center pole piece 24 to flux rising to its flanges need not be more than one-third of the sum of the cross sections of the two magnet blocks at their contacting ends. This arrangement and proportions of these parts are an important feature of my invention.

As previously stated, the permanent magnet blocks 21 and 22 are preferably of larger cross section at their outer ends than at their inner ends, this reduction in cross section from the outer end of each block to its inner end being of the order of eighteen percent. This reduction is permissible because with the paired arrangement of the magnet blocks as described and with the polarities described, about eighteen percent more magnetic flux passes through the large ends of the blocks 21 and 22 into the end pole pieces 23 and 25 than out of the smaller ends of the blocks into the leg of the center pole piece 24. This tapering of the magnet blocks 21 and 22 facilitates casting the blocks by providing a generous foundry draft and reduces the bulk of the high energy alloy required and therefore its weight and cost in proportion to the degree of tapering permissible.

To prevent the accumulation of conveyed material between the pole pieces and the magnetic blocks, blocks 45, 46 of non-magnetic material, such as aluminum, brass or wood, are shown as secured between the flanges of the pole pieces and the faces of the magnetic blocks. A block 47 of similar material is secured by screws or any suitable manner in the gap 37 between the flanges 36 and 31 so as to completely fill this gap and provide a continuing surface between the outer faces of these flanges, this upstream end of the magnetic assembly being designed to provide a deep magnetic field extending to the top of the chute 15 so as to attract magnetic contaminants from the top of the stream to the magnetic assembly to be subsequently caught in the gap 42 on the downstream end of the magnetic assembly. This gap 42 is partially filled by a block 48 of non-magnetic material, as shown in Figs. 2 and 3, this block being shown as secured by a pair of screws.

The parts of the magnetic assembly as above described are shown as being secured together by two tie screws 50 each of which has a head recessed into the bottom of the non-magnetic casing or holder 20 and extending upwardly through holes provided in the corresponding magnetic blocks 21 and 22 and blocks 45 and 46 of non-magnetic material and screwing in the corresponding flanges 36 and 41 of the end pole pieces. Another pair of tie screws 51 connect the bottom of the non-magnetic casing or holder 20 with the leg of the central pole piece 24, as best shown in Fig. 5. Sheets 52 of cardboard are shown as interposed between the magnetic blocks 21 and 22 and the bottom of the casing or holder 20.

This non-magnetic casing or holder is shown as being deeper at its upstream end than at its downstream end, as best shown in Fig. 3, so that this rim is inclined relatively to the bottom of the holder and the rim of this casing or holder is shown as provided with an outwardly extending flange 55, this flange at the sides of the casing or holder fitting against the undersides of the side boards of the chute 15, as best shown in Fig. 5, and at the upstream end of the casing or holder as butting against the downstream end of the bottom board of the chute 15 at the opening 16.

A pair of spaced ears 56 are formed integrally with the upstream wall of the non-magnetic casing or holder 20, these ears being provided with alining openings receiving the opposite ends of a horizontal hinge rod 57, the ends of this horizontal hinge rod being carried by a pair of brackets 58 suitably secured to the underside of the bottom board of the chute 15 at the upper end of the opening 16. The opposite end of the non-magnetic casing or holder 20 is detachably secured to the chute 15 by a fastening device 59 which can be of any suitable form and is shown as comprising an angle 60 secured to the chute and carrying a depending threaded stud 61 on the lower end of which a wing nut 62 is provided. This wing nut supports an elongated clamping plate 63 having a hole through which the stud 61 extends and having a depending finger piece or flange 64 formed at its lower end. The opposite end of this clamping plate is adapted to engage and support the underside of a lug 65 formed integrally with the downstream wall of the non-magnetic casing or holder 20. It will be seen that the casing or holder 20 can readily be released to swing to the pendant dotted line position shown in Fig. 1 for the purpose of cleaning the same by loosening the wing nut 62 and turning the clamping plate 63 about the axis of the stud 61 to release the lug 65. To seal the transverse cracks formed between the casing or holder 20 and the upper and lower ends of the opening 16 in the chute, sheet metal plates 66 and 67, preferably of non-magnetic material, are secured in the bottom of the chute to overlay the upper and lower ends of the rim of the casing or housing 20, as best shown in Fig. 3.

In the present electromagnetic spout magnet design in which three pole pieces and two gaps are provided, the center pole piece being of opposite polarity to the end pole pieces, it has become accepted practice to pass the material to be cleaned across the pole pieces rather than parallel to their lengths. When magnetic contaminants come within the influence of the magnetic field of the upstream gap they become magnetized by induction and are drawn in the direction of increasing field strength. Thus the upstream half of the magnet assembly serves primarily to draw magnetic contaminants to the magnet's exposed surface. It has also become accepted practice in such electromagnets to step the center pole piece so as to provide a sharp downstream polarized edge capable of stopping the downstream motion of magnetic contaminants reaching this edge. At the same time the pocket provided by this step permits the accumulations of a considerable amount of magnetic contaminants without obstructing the flow of the material being treated over the magnet assembly. The downstream gap at this pocket is usually made shorter than the upstream gap, this reduction in gap length producing a shallower field but which has increased strength in the gap space or pocket.

While this sharp edged downstream step of the center piece provides the maximum attractive pull in a direction normal to the flow of materials over this pole piece, my experimental work with spout magnets has demonstrated the greater importance of providing maximum stopping force against the direction of flow at this point rather than in a direction normal to the direction of flow. Thus, it is relatively simple to bring magnetic contaminants into contact with the magnet's working surface because the magnetic force is given considerable time and space in which to act. However, this force is normal to the magnet's working face and produces a stopping force primarily through friction which obviously would have little stopping effect on such objects as steel balls. The forward motion of the material being cleaned and the force of gravity tend to carry the magnetic contaminants in the direction of flow and the magnetic contaminants may therefore reach the step with considerable down-stream velocity. In order to stop the magnetic contaminants at the step the magnetic force at this point must overcome the extraneous forces mentioned and also the inertia or kinetic energy of the magnetic contaminants.

In the magnetic assembly forming the subject of my invention I employ a blunt surface 70, that is, a surface which is curved or beveled at the downstream edge of the step formed by the flange 32. This shape of the center pole piece 24 at this step causes a reduction of pull normal to the direction of flow of the materials and an increase of upstream pull. Furthermore by so curving or beveling the step the stopping action of the magnetic contaminants is less abrupt while with a sharp step as heretofore used, the stopping force is exerted through a very short distance. The superior stopping action of the curved or beveled step has been demonstrated in actual practice on a spout separator made in accordance with my invention. In this separator mounted in a chute having an incline of 45° the stepped central pole piece was constructed at one side to have a sharp downstream edge and at the other side curved, as indicated at 70 in Fig. 3. Steel balls were then released at various points along the chute above the magnet. It was found that the balls could be readily caught by the step when curved or beveled after gaining velocities which rendered ineffective the step where abrupt.

The upper surface of the flange 41 of the end pole piece 25 is preferably arranged above the bottom of the downstream step formed by the flange 32 of the center pole piece 24 and the upstream edge of this flange 41 is beveled, as indicated at 71, this bevel intensifying the magnetic field in the gap 42 and producing a strong field convergence toward the pocket at the base of the step. Magnetic contaminants are therefore magnetically drawn into and held in this pocket. This bevel 71 of the flange 41 also forms a mechanical stop against which contaminants are mechanically arrested.

The loss of magnetization in permanent magnets of the precipitation-hardening magnetic alloys is due chiefly to either or both of two causes; first, the misdirection of the flux within the magnets due to inadvertent contact of magnetizable objects against the sides of the permanent magnets, and second, willful tampering with the magnet by inexperienced hands, as by taking the assembly apart. By the use of the non-magnetic casing or holder 20 which supports the magnet assembly and completely encloses the permanent magnets, not only do I provide support for the structure but all hazards of loss of magnetization in normal service due to either of the above causes is eliminated.

In the form of the invention shown in Figs. 1-5 a single pair of permanent magnet blocks 21, 22 is employed. Where a wider assembly is necessary this number can be increased, as illustrated in Fig. 6 by arranging several pairs of permanent magnet blocks mechanically in parallel to feed common pole pieces. The two pairs of permanent magnet blocks illustrated in Fig. 6 are indicated at 21a, 22a and 21b, 22b. The construction of the individual permanent magnet blocks when arranged in parallel as shown in Fig. 6, is identical with the construction of the blocks 21 and 22 of Figs. 1-5 and the other parts of the assembly are also of the same form so that the same reference numerals have been employed, the assembly being, of course, wider.

It will be noted that when tow pairs of permanent magnet blocks are arranged in parallel, as shown in Fig. 6, the tie bolts 50 pass between the blocks instead of through holes provided in the blocks as in the form of the invention shown in Figs. 1-5. With the pairs of permanent magnet blocks arranged in parallel, as in Fig. 6, it is desirable that the sum of the widths of the blocks at their large ends will not be less than 80% of the length of the pole pieces 23 and 25 with which they make contact as measured across the width of the spout.

The modified form of the invention illustrated in Figs. 7-11 is primarily designed to provide an easily cleanable spout magnet. For this purpose I provide a separable top plate for the magnet assembly against which the tramp iron is drawn and held by the magnet assembly. Means are then provided for withdrawing the magnet assembly from this top plate so as to permit the ready removal of the tramp iron without interference by the now remote magnet field.

In this form of the invention illustrated in Figs. 7-11 the magnetic separator is shown as mounted in a covered inclined chute 75, similar to the chute 15, and provided in its bottom with an opening 76 in which the magnetic separator, indicated generally at 77, is mounted.

The magnetic separator, indicated at 77, is shown as comprising a non-magnetic holder or casing 80 for a pair of permanent magnet blocks 81, 82 and three pole pieces 83, 84 and 85 of high permeability. The permanent magnet blocks 81, 82 are of the same form as the permanent magnet blocks 21, 22 in the form of the invention shown in Figs. 1-5 with the exception that they are cast with longitudinal grooves or slots 86 on their undersides. The purpose of slotting the cast magnet blocks is to provide additional cooling surface so that the best magnetic properties of the high reluctance, precipitation-hardening alloy of which the blocks are cast can be obtained. The rate of cooling with such alloys is critical and constitutes a limitation as to the size and shape of permanent magnets intended to operate at high efficiency. Hence where magnet blocks of unusual size are desired, such as the magnet blocks 81, 82, the provision of the slots 86 provides additional cooling surface and permits of cooling such large blocks uniformly in the manner prescribed for producing optimum magnetic qualities. The slots 86 must extend lengthwise or parallel to the flux path so as not to break or interrupt this flux path. It is desirable to provide the slots 86 with adequate draft and rounded bottoms to facilitate casting and reduce the danger of cracking. Experiment has shown that several small bar magnet castings assembled and magnetized as one magnet in the form of a laminated magnet is stronger than the equivalent magnet made of a single thick casting. It will therefore be seen that the provision of the slots 86 gives this advantage of a laminated construction with the economy of a single casting.

As in the form of the invention shown in Figs. 1–5, the smaller or inner ends of the permanent magnet blocks 81, 82 abut squarely against the opposite sides of the leg 90 of the central pole piece 84, this pole piece being made of low reluctance iron or steel in the form of an elongated bar which is T-shaped in cross section. The upper part of the central pole piece 84 is in the form of flanges 91, 92 which extend in opposite directions over the small ends of the permanent magnet blocks 81, 82 in spaced relation thereto.

The pole piece 83 at the large end of the permanent magnet block 81 is in the form of a bar of low reluctance iron or steel and L-shaped in cross section, this pole piece having a leg or riser 95 against which the large end of the magnet block 81 squarely abuts and having a flange 96 at its upper end which extends inwardly over the large end of the permanent magnet block in spaced relation thereto and toward the flange 91 of the center pole piece 84 to provide a magnetic gap 97 between these flanges.

The pole piece 85 at the large end of the permanent magnet block 82 is in the form of a bar of low reluctance iron or steel and L-shaped in cross section, this pole piece having a leg or riser 100 against which the large end of the magnet block 82 squarely abuts and having a flange 101 at its upper end which extends inwardly over the large end of the permanent magnet block in spaced relation thereto and toward the flange 92 of the center pole piece 84 to provide a magnetic gap 102 between these flanges.

The proportion, form and arrangement of the permanent magnet blocks and the three pole pieces are substantially the same as in the form of the invention shown in Figs. 1–5 and hence this description is not repeated. The upper flanges of the three pole pieces 83, 84, 85 are, however, all arranged in the same plane and the downstream edge of the center pole piece flange 92 need not be curved or beveled and the upstream edge of the flange 101 of the pole piece 85 need not be beveled. Further, the non-magnetic casing 80 is shown as having its rim parallel with its bottom instead of inclined thereto as in the form of the invention shown in Figs. 1–5.

In the form of the invention shown in Figs. 7–11 a simplified means of securing the permanent magnet blocks and the three pole pieces within the holder or casing 80 is provided. As best shown in Fig. 7 the leg 90 of the center pole piece 84 is secured to the bottom of the holder or casing by a pair of transversely spaced screws 103. The magnet blocks 81, 82 and the end pole pieces 83, 85 are then arranged in proper relation in the casing or holder 80 to the center pole piece and a suitable hard setting sealing compound 104 is poured into the casing around the permanent magnet blocks and pole pieces so as to cover the permanent magnet blocks and fill all of the spaces between these blocks and the pole pieces and the casing 80. This sealing compound thereby serves to permanently hold the pole pieces and magnet blocks in the casing and avoids the necessity of the provision of additional screws, as in the form of the invention shown in Figs. 1–5, and also avoids the necessity of piercing the magnet blocks to receive such screws. The sealing compound 104 is preferably capable of being melted at comparatively low temperatures so that if it becomes necessary to remagnetize the magnetic blocks 81, 82 they can be removed from the assembly.

In the form of the invention shown in Figs. 7–11 the downstream end wall of the non-magnetic casing 80 is shown as provided with spaced ears 106, these ears being provided with alining openings receiving the opposite ends of a horizontal hinge rod 107, the ends of the horizontal hinge rod being carried by a pair of brackets 108 suitably secured to the underside of the bottom board of the chute 75 at the lower end of the opening 76. The opposite end of the non-magnetic casing or holder 80 is detachably secured to the chute 75 by a pair of spaced fastening devices 109 which can be of any suitable form each of which is shown as comprising a depending stud bolt 110 suitably secured to the bottom board of the chute 75 immediately above the opening 76 and carrying a wing nut 111 at its lower end. Each of these wing nuts is adapted to engage the underside of an angle piece 112, one leg of which abuts against the underside of the chute and the other leg of which bears against the underside of one of a pair of spaced lugs 113 provided on the upstream end wall of the casing 80. It will therefore be seen that the permanent magnet assembly 77 can readily be swung down beyond the dotted line position shown in Fig. 7.

The easy cleaning feature of the form of the invention shown in Figs. 7–11 is obtained through the use of a separable face plate 115 for the upper or working surface of the magnet assembly, the magnetic contaminants being drawn to this face plate by the fields of the magnet assembly and retained thereon. This face plate is shown as being hinged to the free end of the permanent magnet assembly so that when the magnet assembly is swung to its inoperative depending position, this face plate can be swung away from the magnet assembly and hence separate the caught magnetic contaminants from the field of the permanent magnets and permit them to be dumped. It will be understood, however, that the separate face plate 115 could be permanently mounted in the chute 75 and the magnet assembly swung away therefrom, which arrangement would require the provision of means to prevent the caught magnetic contaminants from rolling down the chute upon withdrawing the magnetic field and thereby recontaminating the cleaned materials.

The face plate 115 for the magnet is shown as comprising an end cross bar in the form of an angle 116, preferably of non-magnetic metal, to the opposite ends of which side angle bars 117, preferably of non-magnetic metal, are secured. To each of the side angle bars 117 is secured a depending ear 118, preferably of non-magnetic metal, these ears being provided with alining openings which receive a horizontal hinge rod 119. This hinge rod also passes through alining openings in the spaced lugs 113 so that the frame formed by the angle bars 116, 117 is hinged to the upstream end of the permanent magnet assembly.

The surface of the face plate 115 is composed of a series of sections which are welded or otherwise secured at their ends to the side bars 117 of this hinged frame. These sections comprise a section 120 of iron or steel having high magnetic permeability which is adapted to overlay the upper face of the end pole piece 83; a section 121 of metal having a low magnetic permeability and which forms a continuation of the section 120 and is arranged to substantially cover the gap 97 at the upstream half of the magnet assembly; a section 122 of iron or steel having high magnetic permeability and which forms a continuation of the section 121 and which is adapted to overlay the upper face of the center pole piece 84, and the downstream end of which is curved, as indicated at 123, to enter the gap 102 at the downstream half of the magnet assembly, this curve 123 functioning in the same manner as the curve 70 at the downstream edge of the flange 32 of the center pole piece 24 in the form of the invention shown in Figs. 1–5; a section 124 of material of low magnetic permeability filling the bottom of the gap 102 and joined to the down curved edge of the section 122; and a section 125 preferably, although not necessarily, of iron or steel of high magnetic permeability adapted to overlay the upper face of the end pole piece 85. This last section 125 has a down turned upstream edge 126 which enters the gap 102 of the downstream half of the magnet assembly and is secured to the section 124, this edge 126 functioning in the same manner as the beveled edge 71 at the upstream edge of the flange 41 of the end pole piece 25 in the form of the invention shown in Figs. 1–5. It will be seen that the sections 120, 122 and 125 are, in effect, a part of the pole pieces 83, 84 and 85 and hence are to be considered as a part of these pole pieces within the meaning of those claims of this application which are directed to the form, proportion and arrangement of the pole pieces of the magnet. While this method of building up the composite plate 125 is somewhat costly, it offers the advantage of improved performance and greater ease of cleaning.

In order to prevent the magnetic contaminants from falling around the edges of the face plate 115 and also from falling between the cracks of its different component plates 120, 121 and 122, sealing means are provided which are preferably constructed as follows:

At the upstream end of the face plate 115, a strip 127 is secured to the bottom of the chute 75 and extends over the angle 116 so as to seal the upper crack between the chute and the frame of the face plate. The cracks between the three plates 120, 121, and 122 are sealed by strips 128 which are welded to the under sides of these plates under these cracks. At the ends of the pocket formed in the gap 102 in the lower half of the permanent magnet assembly the sides of the plate 124 are turned upwardly, as indicated at 129, and flanged at their upper ends, as indicated at 130, these flanges being welded to the under sides of the side angle bars 117 as best shown in Fig. 9. It will be seen that these sides 129 insure the retention of the magnetic contaminants in the pocket formed at the downstream half of the assembly within the gap 102. To seal the crack between the chute and the face plate 115 at the downstream end of the face plate, the plate 125 is extended, as indicated at 131, to project over a bevel 137 provided in the bottom board of the chute 75 at the downstream end of the opening 76. It will be seen that this extension prevents the loss of materials through the corresponding crack at the downstream end of the assembly.

From the foregoing it will be seen that the present invention provides a very compact, simple and inexpensive magnet particularly adapted for use as a spout separator with permanent magnet blocks of minimum weight and size and of such form as to be easily magnetized. The form of the three pole pieces used in conjunction with these permanent magnet blocks also provides the maximum attracting and catching power for the assembly and the assembly is also so mounted as to prevent loss of magnetism through inexperienced handling or through moving magnetizable objects over other than the working face of the magnet assembly. The form of the invention shown in Figs. 7–11 is also capable of being quickly cleaned of trapped magnetic contaminants by the simple expedient of dropping the magnet assembly and then swinging the face plate 115 away from the magnet assembly so as to move the trapped contaminants out of the magnetic field and permit them to drop.

Various modifications of the forms of my invention as described and shown will occur to those skilled in the art, many of which will fall well within the scope of the invention as defined by the appended claims.

I claim as my invention:

1. A permanent magnet assembly, comprising a plurality of pairs of permanent magnet blocks cast of a high energy magnetic alloy, each pair having ends of like polarity arranged in opposition to each other, each of said cast blocks being formed to provide a channel extending parallel to the flux path and increasing the ratio of the exposed surface area to the mass of the casting, a center pole piece for said permanent magnet blocks interposed between the opposing faces of said magnet blocks, end pole pieces for said magnet blocks, each of said end pole pieces being arranged adjacent the opposite end faces of corresponding magnet blocks of each of said pair of blocks, said pole pieces magnetically connecting said blocks in parallel, means for holding said magnet blocks and pole pieces in said assembled relation comprising a protective casing of a nonmagnetic metal completely surrounding all parts of said assembly other than the working surfaces thereof, and means for pivotally securing said casing to a chute with said working surfaces arranged to attract magnetic contaminants from the material passing through said chute.

2. A permanent magnetic separator, comprising a holder, a permanent magnet block having ends of opposite polarity arranged in said holder, pole pieces arranged in said holder at the oppositely polarized ends of said magnet block and formed to provide a magnetic gap, a composite face plate for said holder and adapted to arrest magnetic materials drawn into contact therewith by the magnetic field of said magnet and pole pieces, said face plate being composed of a section of high magnetic permeability material in contact with each of said pole pieces and a section of low magnetic conductance material disposed across said magnetic gap and quick detachable means for separating said composite face plate from the intensified field of said magnet to permit the ready release of said magnetic materials.

3. In a permanent magnetic separator adapted to be mounted in an opening in the bottom of an inclined chute to attract and arrest magnetic contaminants in the materials flowing down said chute, a holder, a permanent magnet block having ends of opposite polarity arranged in said holder, pole pieces arranged in said holder at the oppositely polarized ends of said magnet block, means hingedly connecting said holder with said chute at the downstream end of said opening, quick detachable means for supporting the opposite end of said holder at the upstream end of said opening, a face plate covering said holder and the magnet block and pole pieces contained therein and adapted to arrest magnetic materials drawn into contact therewith by the magnetic field of said magnet block and pole pieces and means for hingedly connecting one end of said face plate with said opposite end of said holder to permit said face plate to be separated from the intensified field of said magnet block and pole pieces and thereby permit the ready release of said magnetic materials from said face plate.

4. A permanent magnet assembly, comprising a pair of permanent magnet high energy magnetic alloy blocks of uniform thickness and each permanently magnetized in the direction of its length, said thickness of each of said blocks lying in the range of 0.3 of the length of the block, and the cross sectional area of each of said blocks being continuously reduced from the outer to the inner end of the block, said total reduction in cross sectional area being of the order of eighteen percent, said blocks being arranged in the same general plane and having their reduced ends of like polarity arranged in opposition to each other, a center pole piece of low reluctance magnetizable material comprising an elongated bar which is T-shaped in cross section and which has its leg interposed between said opposing reduced ends of said magnet blocks and its flanges projecting over the said opposing reduced ends of said blocks in spaced relation thereto, an end pole piece of low reluctance magnetizable material comprising an elongated bar which has a leg arranged adjacent the opposite end face of each of said magnet blocks and has a flange projecting over the enlarged end of the corresponding block in spaced relation thereto and toward the corresponding flange of said T-shaped center pole piece to provide a magnetic gap at each end of said assembly, the distance between each magnet block and the opposing surface of the flange of the corresponding end pole piece being of the order of one-half the width of the corresponding gap, and the width of each gap being between one-quarter and one-half the length of the corresponding magnetized block, and means for holding said magnetized blocks and pole pieces in assembled relation.

5. A permanent magnet assembly, comprising a pair of cast permanent magnet high energy magnetic alloy blocks of uniform thickness and each permanently magnetized in the direction of its length, each of said cast blocks being formed to provide a channel extending parallel to the flux path and increasing the ratio of the exposed surface area to the mass of the casting, said thickness of each of said blocks lying in the range of 0.3 of the length of the block, and the cross sectional area of each of said blocks being continuously reduced from the outer to the inner end of the block, said total reduction in cross sectional area being of the order of eighteen percent, said blocks being arranged in the same general plane and having their reduced ends of like polarity arranged in opposition to each other, a center pole piece of low reluctance magnetizable material comprising an elongated bar which is T-shaped in cross section and which has its leg interposed between said opposing reduced ends of said magnet blocks and its flanges projecting over the said opposing reduced ends of said blocks in spaced relation thereto, an end pole piece of low reluctance magnetizable material comprising an elongated bar which has a leg arranged adjacent the opposite end face of each of said magnet blocks and has a flange projecting over the enlarged end of the corresponding block in spaced relation thereto and toward the corresponding flange of said T-shaped center pole piece to provide a magnetic gap at each end of said assembly, the distance between each magnet block and the opposing surface of the flange of the corresponding end pole piece being of the order of one-half the width of the corresponding gap, and the width of each gap being between one-quarter and one-half the length of the corresponding magnetized block, and means for holding said magnetized blocks and pole pieces in assembled relation.

6. In a permanent magnetic separator adapted to be mounted in an opening in the bottom of an inclined chute to attract and arrest magnetic contaminants in the materials flowing down said chute, a permanent magnet in said opening, means hingedly connecting said permanent magnet with said chute at the downstream end of said opening, quick detachable means for supporting the opposite end of said permanent magnet at the upstream end of said opening, a face plate covering said permanent magnet and adapted to arrest magnetic materials drawn into contact therewith by the magnetic field of said permanent magnet and means for hingedly connecting one end of said face plate with said opposite end of said permanent magnet to permit said face plate to be separated from the intensified field of said permanent magnet and thereby permit the ready release of said magnetic materials from said face plate.

7. In a permanent magnetic separator adapted to be mounted in an opening in the bottom of an inclined chute to attract and arrest magnetic contaminants in the materials flowing down said chute, a protective holder of non-magnetic metal having a bottom and side walls rising from said bottom, a permanent magnet secured in said holder and having its working surfaces arranged at the open top of said holder, means hingedly connecting said holder with said chute at the downstream end of said opening, quick detachable means for supporting the opposite end of said holder at the upstream end of said opening, a face plate covering said holder and the permanent magnet contained therein and adapted to arrest magnetic material drawn into contact therewith by the magnetic field of said permanent magnet, and means for hingedly connecting one end of said face plate with said opposite end of said holder to permit said face plate to be separated from the intensified field of said permanent magnet and thereby permit the ready release of said magnetic materials from said face plate.

8. In a permanent magnet separator adapted to be mounted in the bottom of an inclined chute to attract and arrest magnetic contaminants in the materials flowing down said chute, a pair of permanent magnet blocks having ends of like polarity arranged in opposition to each other, a center pole piece which is T-shaped in cross section and has its leg projecting downwardly into said casing and interposed between the opposing faces of said permanent magnet blocks and with its flanges extending over the upper faces of said permanent magnet blocks, said flanges being of substantial thickness, end pole pieces each of which has a leg arranged adjacent the opposite end face of the corresponding permanent magnet block and each of which also has a flange extending over the upper face of the corresponding permanent magnet block and toward the corresponding flange of said T-shaped center pole piece to provide two magnetic gaps, one in the upstream part of said magnetic separator and the other in the downstream part thereof, the magnetic gap in the downstream part of the magnetic separator being formed to provide a pocket for catching the magnetic contaminants, and means providing a convex curvature at the downstream edge of said center pole piece which forms the upper margin of said pocket, said curvature forming a continuation of the face of said center pole piece over which said materials travel before reaching said pocket and said curvature being of a substantial length in relation to the total thickness of the corresponding flange of said center pole piece thereby to effect, at this curvature, a reduction of pull normal to the flow of the materials over the separator and an increase of the upstream pull and the distance in which this upstream pull is exerted whereby steel balls and the like are more effectively drawn into said pocket and trapped.

9. In a permanent magnet separator adapted to be mounted in the bottom of an inclined chute to attract and arrest magnetic contaminants in the materials flowing down said chute, a pair of permanent magnet blocks having ends of like polarity arranged in opposition to each other, a center pole piece which is T-shaped in cross section and has its leg projecting downwardly into said casing and interposed between the opposing faces of said permanent magnet blocks and with its flanges extending over the upper faces of said permanent magnet blocks, said flanges being of substantial thickness, end pole pieces each of which has a leg arranged adjacent the opposite end face of the corresponding permanent magnet block and each of which also has a flange extending over the upper face of the corresponding permanent magnet block and toward the corresponding flange of said T-shaped center pole piece to provide two magnetic gaps, one in the upstream part of said magnetic separator and the other in the downstream part thereof, the magnetic gap in the downstream part of the magnetic separator being formed to provide a pocket for catching the magnetic contaminants, means providing a convex curvature at the downstream edge of said center pole piece which forms the upper margin of said pocket, said curvature forming a continuation of the face of said center pole piece over which said materials travel before reaching said pocket and said curvature being of a substantial length in relation to the total thickness of the corresponding flange of said center pole piece thereby to effect, at this curvature, a reduction of pull normal to the flow of the materials over the separator and an increase of the upstream pull and the distance in which this upstream pull is exerted whereby steel balls and the like are more effectively drawn into said pocket and trapped, and means providing an abrupt angular striking face of substantial area in said pocket at the upstream edge of the downstream end pole piece.

WILLIAM BYRD, Jr.